United States Patent
Shi et al.

(10) Patent No.: US 12,477,606 B2
(45) Date of Patent: Nov. 18, 2025

(54) COMMUNICATION METHOD, APPARATUS, AND SYSTEM

(71) Applicant: Huawei Technologies Co., Ltd., Shenzhen (CN)

(72) Inventors: Xiaoli Shi, Shanghai (CN); Ruiyue Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 409 days.

(21) Appl. No.: 17/937,196

(22) Filed: Sep. 30, 2022

(65) Prior Publication Data

US 2023/0024669 A1 Jan. 26, 2023

Related U.S. Application Data

(63) Continuation of application No. PCT/CN2021/082746, filed on Mar. 24, 2021.

(30) Foreign Application Priority Data

Apr. 3, 2020 (CN) .......................... 202010261316.1

(51) Int. Cl.
*H04W 76/15* (2018.01)
*H04W 48/02* (2009.01)

(52) U.S. Cl.
CPC ........... *H04W 76/15* (2018.02); *H04W 48/02* (2013.01)

(58) Field of Classification Search
None
See application file for complete search history.

(56) References Cited

U.S. PATENT DOCUMENTS

| 10,757,619 B2 | 8/2020 | Worrall et al. |
| 11,304,250 B2 * | 4/2022 | Yang .................. H04W 72/541 |
| 11,743,782 B2 * | 8/2023 | Zetterberg ............ H04W 24/02 455/436 |

(Continued)

FOREIGN PATENT DOCUMENTS

| CN | 107079510 A | 8/2017 |
| CN | 108924823 A | 11/2018 |

(Continued)

OTHER PUBLICATIONS

Vivo, China Telecom, "NR cell type indication", 3GPP TSG-RAN WG2 Meeting #103, Aug. 20-24, 2018, R2-1811773, 3 pages, Gothenburg, Sweden.

(Continued)

*Primary Examiner* — Hong S Cho
(74) *Attorney, Agent, or Firm* — SLATER MATSIL, LLP

(57) ABSTRACT

Embodiments of this application provide a communication method, apparatus, and system. The method includes a network management entity determines a dual connectivity attribute of a first neighbor cell of a first cell, where the dual connectivity attribute is used to indicate whether the first neighbor cell can be used as a secondary cell of the first cell, the first cell belongs to a first base station, and the first neighbor cell belongs to a second base station; and the network management entity sends configuration information to the first base station, where the configuration information indicates the first base station to configure the dual connectivity attribute of the first neighbor cell.

18 Claims, 4 Drawing Sheets

(56) References Cited

U.S. PATENT DOCUMENTS

| | | | |
|---|---|---|---|
| 2019/0200406 A1 | 6/2019 | Henttonen et al. | |
| 2019/0223091 A1 | 7/2019 | Hang-Fu et al. | |
| 2019/0306728 A1* | 10/2019 | Lei | H04W 36/00698 |
| 2019/0356536 A1 | 11/2019 | Lee et al. | |
| 2019/0357095 A1 | 11/2019 | Pakniat et al. | |

FOREIGN PATENT DOCUMENTS

| | | | | |
|---|---|---|---|---|
| EP | 3251417 B1 * | 8/2019 | | H04W 16/32 |
| EP | 2983439 B1 * | 12/2020 | | H04W 16/24 |
| JP | 2017505063 A | 2/2017 | | |
| WO | 2015188494 A1 | 12/2015 | | |
| WO | 2019105064 A1 | 6/2019 | | |

OTHER PUBLICATIONS

LG Electronics Inc., "Impacts on DC based Mobility Enhancement", 3GPP TSG-RAN WG3 Meeting #104, USA, May 13-17, 2019, R3-192504, 3 pages, Reno, Nevada.

Bgpp TS 36.300 V16.0.0 (Dec. 2019), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 16), 366 pages.

3GPP TS 28.541 V16.4.1 (Mar. 2020), 3rd Generation Partnership Project; Technical Specification Group Services and SystemAspects; Management and orchestration; 5G Network Resource Model (NRM); Stage 2 and stage 3(Release 16), 324 pages.

3GPP TS 38.423 V16.1.0 (Mar. 2020), 3rd Generation Partnership Project; Technical Specification Group Radio Access Network; NG-RAN; Xn application protocol (XnAP)(Release 16), 334 pages.

3GPP TS 28.532 V16.3.0 (Mar. 2020), 3rd Generation Partnership Project; Technical Specification Group Services and System Aspects; Management and orchestration; Generic management services; (Release 16), 230 pages.

3GPP TS 28.526 V15.1.0 (Dec. 2018), 3rd Generation Partnership Project; Technical Specification Group Services and System Aspects; Telecommunication management; Life Cycle Management (LCM) for mobile networks that include virtualized network functions; Procedures(Release 15), 39 pages.

3GPP TS 28.658 V16.2.0 (Dec. 2019), 3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS)(Release 16), 62 pages.

3GPP TS 28.540 V16.2.0 (Mar. 2020), 3rd Generation Partnership Project; Technical Specification Group Services and System Aspects; Management and orchestration; 5G Network Resource Model (NRM); Stage 1(Release 16), 10 pages.

3GPP TS 37.340 V16.0.0 (Dec. 2019), 3rd Generation Partnership Project; Technical Specification Group Radio Access Network; Evolved Universal Terrestrial Radio Access (E-UTRA) and NR; Multi-connectivity; Stage 2(Release 16), 72 pages.

3GPP TS 28.313 V0.3.0 (Mar. 2020), 3rd Generation Partnership Project; Technical Specification Group Services and System Aspects; Management and orchestration; Self-Organizing Networks (SON) for 5G networks (Release 16), 43 pages.

3GPP TS 32.500 V15.0.0 (Jun. 2018), 3rd Generation Partnership Project; Technical Specification Group Services and System Aspects; Telecommunication Management; Self-Organizing Networks (SON); Concepts and requirements (Release 15), 13 pages.

Samsung, EN-DC support in IAB, 3GPP TSG RAN WG2#106 R2-1908028, 3GPP, May 3, 2019, total 4 pages.

* cited by examiner

COMMUNICATION METHOD, APPARATUS, AND SYSTEM

CROSS-REFERENCE TO RELATED APPLICATIONS

This application is a continuation of International Application No. PCT/CN2021/082746, filed on Mar. 24, 2021, which claims priority to Chinese Patent Application No. 202010261316.1, filed on Apr. 3, 2020. The disclosures of the aforementioned applications are incorporated herein by reference in these entireties.

TECHNICAL FIELD

Embodiments of this application relate to the field of communication technologies, and in particular, to a communication method, apparatus, and system.

BACKGROUND

An objective of an automatic neighbor relation (ANR) function is to reduce burden of manually managing a neighbor cell relation (NCR) by an operator. The ANR function is located in a base station, and is used to manage a neighbor cell relation table (NCRT) of a cell of the base station. Each neighbor cell relation table includes one or more neighbor cell relations.

Each neighbor cell relation in the neighbor cell relation table has three attributes: NoRemove, NoHO, and NoX2. NoRemove indicates that the base station does not remove the neighbor cell relation from the neighbor cell relation table. NoHO indicates the base station cannot use the neighbor cell relation for handover. NoX2 indicates that the base station cannot use the neighbor cell relation to initiate an X2 interface setup procedure to a base station to which a target cell belongs.

ANR functions of long term evolution (LTE) include a neighbor detection function (NDF), a neighbor removal function, and the like. The neighbor detection function is used to detect a new neighbor cell and add the new neighbor cell to the neighbor cell relation table. The neighbor removal function is used to remove an unnecessary neighbor cell relation from the neighbor cell relation table.

The ANR functions of LTE are also applicable to new radio (NR). The NoRemove, NoHO, and NoX2 attributes can still be used in NR.

However, the foregoing neighbor cell relation table cannot reflect a dual connectivity relationship between a cell and a neighbor cell.

SUMMARY

Embodiments of this application provide a communication method, apparatus, and system, to configure a dual connectivity relationship between a cell and a neighbor cell.

According to a first aspect, an embodiment of this application provides a communication method, including a network management entity determines a dual connectivity attribute of a first neighbor cell of a first cell, where the dual connectivity attribute is used to indicate whether the first neighbor cell can be used as a secondary cell of the first cell, the first cell belongs to a first base station, and the first neighbor cell belongs to a second base station; and the network management entity sends configuration information to the first base station, where the configuration information indicates the first base station to configure the dual connectivity attribute of the first neighbor cell.

Based on the foregoing solution, the dual connectivity attribute is configured for a neighbor cell of the first cell, so that the first base station learns that neighbor cells of first cells cannot be used as secondary cells to perform multi-connectivity data transmission, so that a case that a system throughput reduces caused because a base station incorrectly configures the dual connectivity attribute is avoided when the base station cannot learn of an operator policy.

In a possible implementation method, that the configuration information indicates the first base station to configure the dual connectivity attribute of the first neighbor cell includes the configuration information indicates the first base station to configure indication information for the first neighbor cell, where the indication information indicates that the first neighbor cell can be used as the secondary cell of the first base station, or indicates that the first neighbor cell cannot be used as the secondary cell of the first base station.

In a possible implementation method, that the configuration information indicates the first base station to configure the dual connectivity attribute of the first neighbor cell includes the configuration information indicates the first base station to add the first neighbor cell to a black list, where the black list is used to record a cell that is in a neighbor cell of the first cell and that cannot be used as the secondary cell of the first cell; or the configuration information indicates the first base station to add the first neighbor cell to a white list, where the white list is used to record a cell that is in a neighbor cell of the first cell and that can be used as the secondary cell of the first cell.

In a possible implementation method, before that the network management entity sends configuration information to the first base station, the network management entity determines that the first neighbor cell has a dual connectivity capability, where the dual connectivity capability is used to indicate that the first neighbor cell supports establishment of dual connectivity.

In a possible implementation method, the first cell is an NR cell, the dual connectivity capability includes an EN-DC capability, and the EN-DC capability is used to indicate that the first cell supports establishment of EN-DC; the first cell is an NR cell, the dual connectivity capability includes an NGEN-DC capability, and the NGEN-DC capability is used to indicate that the first cell supports establishment of NGEN-DC; the first cell is an NR cell, the dual connectivity capability includes an NR-DC capability, and the NR-DC capability is used to indicate that the first cell supports establishment of NR-DC; or the first cell is an LTE cell, the dual connectivity capability includes an NE-DC capability, and the NE-DC capability is used to indicate that the first cell supports establishment of NE-DC.

In a possible implementation method, the first base station is a primary base station, and the second base station is a secondary base station.

In a possible implementation method, the network management entity is a management service consumer, a management service producer, an MBB automation engine, a network management system, or an element management system.

In a possible implementation method, that a network management entity determines a dual connectivity attribute of a first neighbor cell of a first cell includes the network management entity determines a dual connectivity attribute of the first neighbor cell based on first information of the first cell and/or second information of the first neighbor cell, where the first information includes one or more of measurement information, performance information, and alarm information of the first cell, and the second information includes one or more of measurement information, performance information, and alarm information of the first neighbor cell; or the network management entity determines a dual connectivity attribute of the first neighbor cell according to a cell policy maintained by an operator.

According to a second aspect, an embodiment of this application provides a communication method, including the network management entity determines a dual connectivity capability of a first cell, where the dual connectivity capability is used to indicate whether the first cell supports establishment of dual connectivity; and the network management entity sends configuration information to a base station to which the first cell belongs, where the configuration information indicates whether the first cell supports the dual connectivity capability.

Based on the foregoing solutions, the dual connectivity capability is configured for the first cell. Therefore, the base station to which the first cell belongs may send the dual connectivity capability of the first cell to another base station through an interface between the base stations, so that the another base station decides whether the dual connectivity can be established based on the first cell. Further, a problem that a system throughput reduces because a base station incorrectly configures the dual connectivity capability when the base station cannot learn of an operator policy in a multi-connectivity data transmission scenario can be resolved. Alternatively, it is understood as that, in the conventional technology, when the base station cannot learn of the operator policy, the base station configures the dual connectivity capability of a cell. This may cause incorrect configuration, and reduce the system throughput. According to the foregoing solutions of this application, because the network management entity configures the dual connectivity capability of the cell, the dual connectivity capability may be configured with reference to the operator policy, to implement correct configuration, so that the problem that the system throughput reduces due to incorrect configuration does not occur.

In a possible implementation method, the first cell is an NR cell, the dual connectivity capability includes an EN-DC capability, and the EN-DC capability is used to indicate whether the first cell supports establishment of EN-DC; the first cell is an NR cell, the dual connectivity capability includes an NGEN-DC capability, and the NGEN-DC capability is used to indicate whether the first cell supports establishment of NGEN-DC; the first cell is an NR cell, the dual connectivity capability includes an NR-DC capability, and the NR-DC capability is used to indicate whether the first cell supports establishment of NR-DC; or the first cell is an LTE cell, the dual connectivity capability includes an NE-DC capability, and the NE-DC capability is used to indicate whether the first cell supports establishment of NE-DC.

According to a third aspect, an embodiment of this application provides a communication apparatus. The apparatus may be a network management entity, or may be a chip used for the network management entity. The apparatus has a function of implementing the method in the first aspect or the implementation methods of the first aspect. The function may be implemented by hardware, or may be implemented by hardware executing corresponding software. The hardware or the software includes one or more modules corresponding to the function.

According to a fourth aspect, an embodiment of this application provides a communication apparatus. The apparatus may be a network management entity, or may be a chip used for the network management entity. The apparatus has a function of implementing the method in the second aspect or the implementation methods of the second aspect. The function may be implemented by hardware, or may be implemented by hardware executing corresponding software. The hardware or the software includes one or more modules corresponding to the function.

According to a fifth aspect, an embodiment of this application provides a communication apparatus. The apparatus includes a processor and a memory. The memory is configured to store computer-executable instructions. When the apparatus runs, the processor executes the computer-executable instructions stored in the memory, to enable the apparatus to perform the method in the first aspect, the method in the second aspect, the implementation methods of the first aspect, or the implementation methods of the second aspect.

According to a sixth aspect, an embodiment of this application provides a communication apparatus. The apparatus includes a processor and an interface circuit. The processor is configured to communicate with another apparatus through the interface circuit, and perform the method in the first aspect, the method in the second aspect, the implementation methods of the first aspect, or the implementation methods of the second aspect. There are one or more processors.

According to a seventh aspect, an embodiment of this application provides a communication apparatus. The apparatus includes a processor. The processor is connected to a memory, and configured to invoke a program stored in the memory to perform the method in the first aspect, the method in the second aspect, the implementation methods of the first aspect, or the implementation methods of the second aspect. The memory may be located inside or outside the apparatus. In addition, there are one or more processors.

According to an eighth aspect, an embodiment of this application further provides a computer-readable storage medium. The computer-readable storage medium stores instructions. When the instructions run on a computer, a processor is enabled to perform the method in the first aspect, the method in the second aspect, the implementation methods of the first aspect, or the implementation methods of the second aspect.

According to a ninth aspect, an embodiment of this application further provides a computer program product. The computer product includes a computer program. When the computer program runs, the method in the first aspect, the method in the second aspect, the implementation methods of the first aspect, or the implementation methods of the second aspect are performed.

According to a tenth aspect, an embodiment of this application further provides a chip system. The chip system includes a processor, configured to perform the method in the first aspect, the method in the second aspect, the implementation methods of the first aspect, or the implementation methods of the second aspect.

According to a tenth aspect, an embodiment of this application further provides a communication system, including a network management entity and a first base station, where the network management entity is configured to determine a dual connectivity attribute of a first neighbor cell of a first cell, where the dual connectivity attribute is used to indicate whether the first neighbor cell can be used as a secondary cell of the first cell, the first cell belongs to the first base station, and the first neighbor cell belongs to a second base station; and send configuration information to the first base station; and the first base station is configured to receive the configuration information from the network management entity; and configure the dual connectivity attribute of the first neighbor cell of the first cell based on the configuration information.

In a possible implementation method, that the first base station is configured to configure the dual connectivity attribute of the first neighbor cell of the first cell based on the configuration information specifically includes being configured to configure indication information for the first neighbor cell based on the configuration information, where the indication information indicates that the first neighbor cell can be used as the secondary cell of the first base station, or indicates that the first neighbor cell cannot be used as the secondary cell of the first base station.

In a possible implementation method, that the first base station is configured to configure the dual connectivity attribute of the first neighbor cell of the first cell based on the configuration information specifically includes being configured to add the first neighbor cell to a black list based on the configuration information, where the black list is used to record a cell that is in a neighbor cell of the first cell and that cannot be used as the secondary cell of the first cell; or being configured to add the first neighbor cell to a white list based on the configuration information, where the white list is used to record a cell that is in a neighbor cell of the first cell and that can be used as the secondary cell of the first cell.

In a possible implementation method, before the sending configuration information to the first base station, the network management entity is further configured to determine that the first neighbor cell has a dual connectivity capability, where the dual connectivity capability is used to indicate that the first neighbor cell supports establishment of dual connectivity.

In a possible implementation method, the first cell is an NR cell, the dual connectivity capability includes an EN-DC capability, and the EN-DC capability is used to indicate that the first cell supports establishment of EN-DC; the first cell is an NR cell, the dual connectivity capability includes an NGEN-DC capability, and the NGEN-DC capability is used to indicate that the first cell supports establishment of NGEN-DC; the first cell is an NR cell, the dual connectivity capability includes an NR-DC capability, and the NR-DC capability is used to indicate that the first cell supports establishment of NR-DC; or the first cell is an LTE cell, the dual connectivity capability includes an NE-DC capability, and the NE-DC capability is used to indicate that the first cell supports establishment of NE-DC.

In a possible implementation method, the first base station is a primary base station, and the second base station is a secondary base station.

In a possible implementation method, the network management entity is a management service consumer, a management service producer, an MBB automation engine, a network management system, or an element management system.

In a possible implementation method, that the network management entity is configured to determine a dual connectivity attribute of a first neighbor cell of a first cell specifically includes being configured to determine a dual connectivity attribute of the first neighbor cell based on first information of the first cell and/or second information of the first neighbor cell, where the first information includes one or more of measurement information, performance information, and alarm information of the first cell, and the second information includes one or more of measurement information, performance information, and alarm information of the first neighbor cell; or being configured to determine a dual connectivity attribute of the first neighbor cell according to a cell policy maintained by an operator.

DETAILED DESCRIPTION OF ILLUSTRATIVE EMBODIMENTS

Figure 1A:
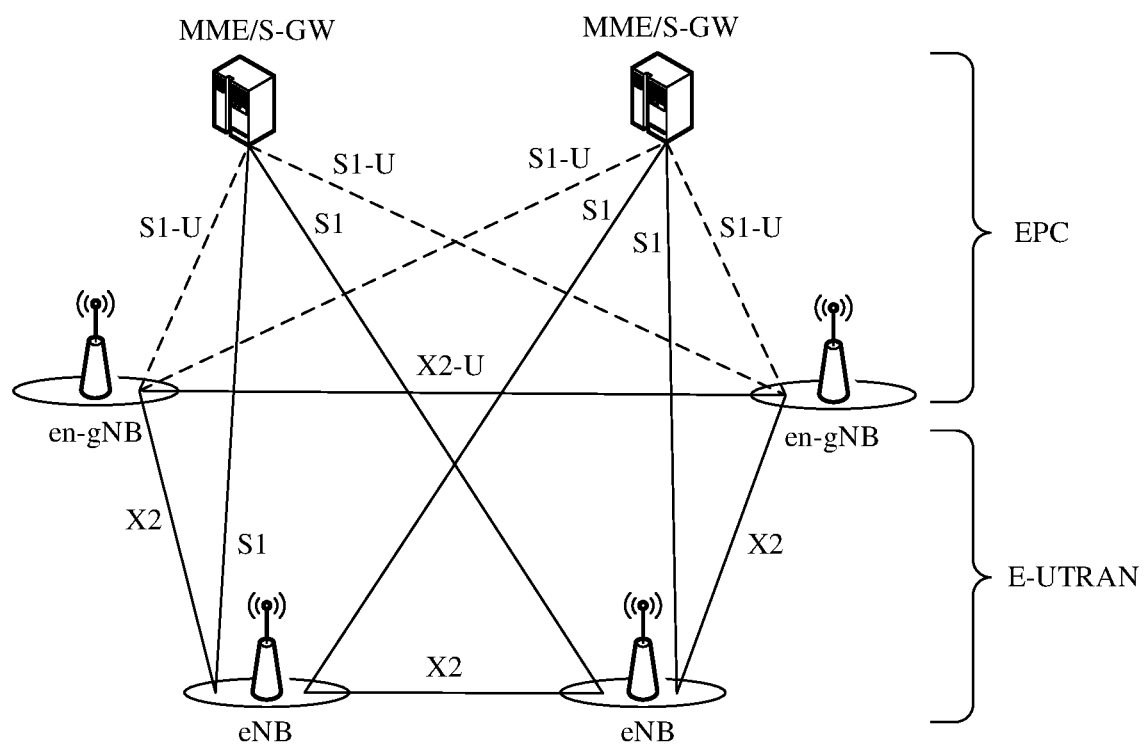
FIG. 1(a) is a schematic diagram of a 4G network architecture.

FIG. 1(a) is a schematic diagram of a 4th generation (4G) network architecture. The architecture includes an evolved packet core (EPC) network and an evolved universal terrestrial radio access network (E-UTRAN). The E-UTRAN includes an evolved NodeB (eNB) in LTE and a next generation NodeB (gNB) in NR. In addition, a g NodeB interconnected to the 4G EPC is referred to as an en-gNB.

Dual connectivity formed by using the eNB as a primary base station and using the en-gNB as a secondary base station is referred to as E-UTRA-NR dual connectivity (EN-DC). That is, in an EN-DC architecture, the primary base station is the eNB, and the secondary base station is the en-gNB.

Figure 1B:
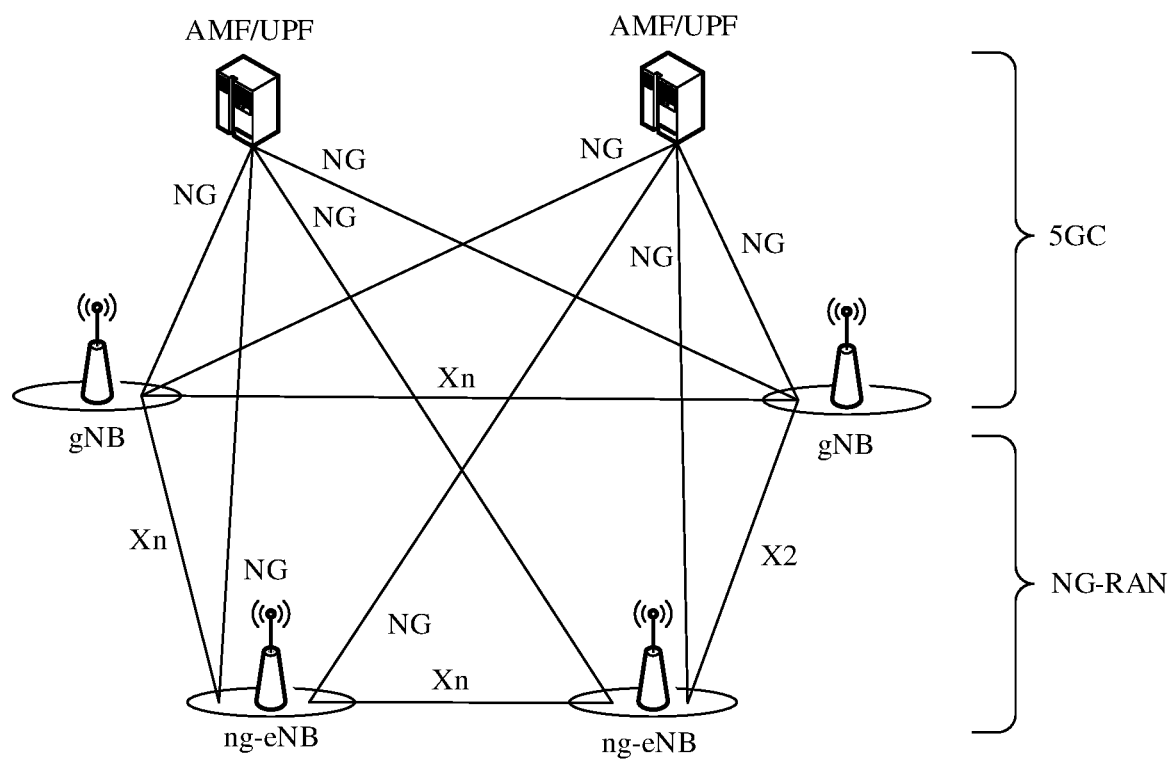
FIG. 1(b) is a schematic diagram of a 5G network architecture.

FIG. 1(b) is a schematic diagram of a 5th generation (5G) network architecture. The architecture includes an evolved 5th generation core (5GC) network and a next generation radio access network (NG-RAN). The NG-RAN supports multi-radio dual connectivity, and an NG-RAN node includes the gNB in NR and the eNB in LTE. In addition, an eNB interconnected to the 5GC is referred to as an ng-eNB.

Dual connectivity formed by using the gNB as a primary base station and using the ng-eNB as a secondary base station is referred to as NR-E-UTRA dual connectivity (NE-DC). That is, in NE-DC, the primary base station is the gNB, and the secondary base station is the ng-eNB.

Dual connectivity formed by using the ng-eNB as a primary base station and using the gNB as a secondary base station is referred to as E-UTRA-NR dual connectivity of the NG-RAN (NGEN-DC). That is, in NGEN-DC, the primary base station is the ng-eNB, and the secondary base station is the gNB.

Dual connectivity formed by using the gNB as a primary base station and using another gNB as a secondary base station is referred to as NR-NR dual connectivity (NR-DC). That is, in NR-DC, the primary base station and the secondary base station are the gNBs.

It should be noted that, in an actual application, dual connectivity may also be referred to as multi-connectivity, and dual connectivity and multi-connectivity have a same meaning.

An ANR function allows a network management system (for example, an operations, administration and maintenance (OAM) system) to manage a neighbor cell relation table.

The network management system may add or remove a neighbor cell relation in the neighbor cell relation table, or may change one or more attributes in the neighbor cell relation table. A change of the neighbor cell relation table is notified to the network management system in time.

One neighbor cell relation table is maintained for each cell of a base station. Each neighbor cell relation table includes a target cell identifier, which is used to identify a target cell.

An existing neighbor cell relation from a source cell to a target cell means that the source cell: a) learns of an evolved universal terrestrial radio access network cell global identifier (ECGI)/cell global identifier (CGI) and a physical cell identifier (PCI) of the target cell; b) has a record of the target cell corresponding to the source cell in the neighbor cell relation table; and c) defines the attributes in the neighbor cell relation table, where these attributes may be configured by the network management system or may be defined as default values.

Each neighbor cell relation in the neighbor cell relation table has three attributes: NoRemove, NoHO, and NoX2. NoRemove indicates that the base station does not remove the neighbor cell relation from the neighbor cell relation table. NoHO indicates the base station cannot use the neighbor cell relation for handover. NoX2 indicates that the base station cannot use the neighbor cell relation to initiate an X2 interface setup procedure to a base station to which a target cell belongs.

NoX2 is at a granularity of a base station, and configured in forms of a black list and white list. NoRemove and NoHO are each at a granularity of a cell, and are configured in forms of "isHOAllowed" indicating whether handover is allowed and "isRemoveAllowed" indicating whether removal is allowed.

Black lists and white lists of X2 and Xn are defined in a GNBCUCPFunction class, as shown in Table 1.

TABLE 1

| Attribute name | Support qualifier |
| --- | --- |
| X2BlackList | Conditionally mandatory (CM) |
| X2WhiteList | Conditionally mandatory (CM) |
| XnBlackList | Conditionally mandatory (CM) |
| XnWhiteList | Conditionally mandatory (CM) |

A meaning of the CM is conditionally mandatory, and the condition is specifically whether an ANR feature is supported. To be specific, when the ANR feature is supported, the attribute is mandatory. Descriptions are centrally provided herein. A meaning of CM in subsequent embodiments is the same, and details are not described.

In an NRcellRelation class, whether to delete and whether to hand over are defined, as shown in Table 2.

TABLE 2

| Attribute name | Support qualifier |
| --- | --- |
| isRemoveAllowed | Conditionally mandatory (CM) |
| isHOAllowed | Conditionally mandatory (CM) |

Currently, an ANR function of LTE is also applicable to NR. The NoRemove, NoHO, and NoX2 attributes can still be used in NR.

In embodiments of this application, an attribute used to indicate that the base station cannot use the neighbor cell relation for dual connectivity may be further added to NR; or the attribute is understood as that the base station cannot use a cell in the neighbor cell relation as a secondary cell to perform dual connectivity data transmission; or the attribute is understood as that a cell in the neighbor cell relation cannot be used as a secondary cell to perform dual connectivity data transmission. In the following descriptions, the attribute may be referred to as a dual connectivity attribute for short.

For example, in an EN-DC architecture, the attribute may be referred to as No EN-DC, and is used to indicate that the base station cannot use the neighbor cell relation for EN-DC. It may also be understood that the eNB cannot use a cell in the neighbor cell relation (to be specific, a cell of the en-gNB) as a secondary cell to perform EN-DC data transmission.

For another example, in an NE-DC architecture, the attribute may be referred to as No NE-DC, and is used to indicate that the base station cannot use the neighbor cell relation for NE-DC. It may also be understood that the gNB cannot use a cell in the neighbor cell relation (to be specific, a cell of the ng-eNB) as a secondary cell to perform NE-DC data transmission.

For another example, in an NGEN-DC architecture, the attribute may be referred to as No NGEN-DC, and is used to indicate that the base station cannot use the neighbor cell relation for NGEN-DC. It may also be understood that the ng-eNB cannot use a cell in the neighbor cell relation (to be specific, a cell of the gNB) as a secondary cell to perform NGEN-DC data transmission.

For another example, in an NR-DC architecture, the attribute may be referred to as No NR-DC, and is used to indicate that the base station cannot use the neighbor cell relation for NR-DC. It may also be understood that the gNB cannot use a cell in the neighbor cell relation (to be specific, a cell of the gNB) as a secondary cell to perform NR-DC data transmission.

After the dual connectivity attribute is introduced, how to configure the dual connectivity attribute for a corresponding cell is a problem to be resolved in this application.

Whether a cell can be used as a secondary cell depends on actual load of the cell and a policy of an operator. Therefore, the base station cannot determine cells that cannot be used as secondary cells. For example, some cells are important (VIP) cells, and the cells cannot be used as secondary cells, so that resource utilization rates of the VIP cells are ensured. Therefore, in embodiments of this application, it is proposed that a network management entity configure the dual connectivity attribute.

In addition, a prerequisite for determining whether a cell can be used as a secondary cell is that the cell has a capability of supporting dual connectivity. Therefore, in embodiments of this application, it is further proposed that the network management entity configure a capability of supporting dual connectivity for a cell, or may be referred to as a dual connectivity switch. This is not limited herein in the present disclosure.

The network management entity in embodiments of this application may be a management service consumer (Consumer of MnS), a management service producer (Producer of MnS), an MBB automation engine (MAE), a network management system (NMS), or an element management system (EMS).

Figure 2:
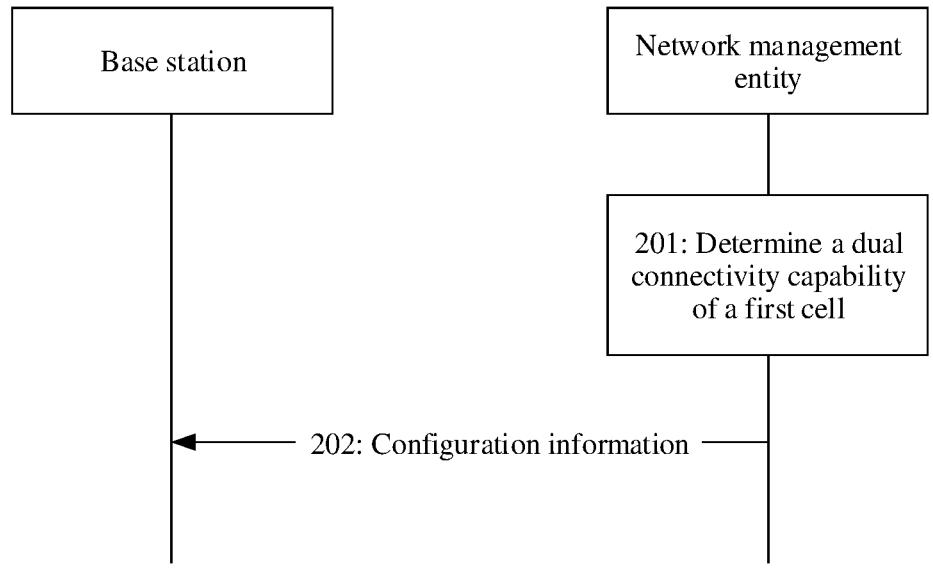
FIG. 2 is a schematic flowchart of a communication method according to an embodiment of this application.

Based on the network architecture shown in FIG. 1(a) or FIG. 1(b), as shown in FIG. 2, an embodiment of this application provides a communication method. The communication method may also be referred to as a method for configuring a dual connectivity capability for a cell. The method is used to configure a dual connectivity capability for a cell.

The method includes the following steps.

Step 201: A network management entity determines a dual connectivity capability of a first cell, where the dual connectivity capability is used to indicate whether the first cell supports establishment of dual connectivity.

It should be noted that the dual connectivity capability may alternatively be a dual connectivity switch, to be specific, used to indicate whether the first cell enables a dual connectivity function.

It should be further noted that the network management entity may determine the dual connectivity capability of the first cell by obtaining one or more of measurement information (for example, reference signal received power (RSRP) of the cell, and reference signal received quality (RSRQ) of the cell), performance information (for example, a handover success rate of the cell, a throughput rate of the cell, and a resource utilization rate of the cell), and alarm information of the first cell, or the network management entity may further determine the dual connectivity capability of the first cell by using a cell policy (for example, a VIP cell) maintained by an operator.

It should be further noted that the dual connectivity capability may alternatively be a dual connectivity capability of a base station. To be specific, all cells of the base station support establishment of dual connectivity. Similarly, the network management entity may determine the dual connectivity capability of the base station and send the dual connectivity capability to the base station. This is not limited herein in the present disclosure.

Step 202: The network management entity sends configuration information to a base station to which the first cell belongs, where the configuration information indicates whether the first cell supports the dual connectivity capability.

Based on the foregoing solutions, the dual connectivity capability is configured for the first cell. Therefore, the base station to which the first cell belongs may send the dual connectivity capability of the first cell to another base station through an interface between the base stations, so that the another base station decides whether the dual connectivity can be established based on the first cell. Further, a problem that a system throughput reduces because a base station incorrectly configures the dual connectivity capability when the base station cannot learn of an operator policy in a multi-connectivity data transmission scenario can be resolved. Alternatively, it is understood as that, in the conventional technology, when the base station cannot learn of the operator policy, the base station configures the dual connectivity capability of a cell. This may cause incorrect configuration, and reduce the system throughput. According to the foregoing solutions of this application, because the network management entity configures the dual connectivity capability of the cell, the dual connectivity capability may be configured with reference to the operator policy, to implement correct configuration, so that the problem that the system throughput reduces due to incorrect configuration does not occur.

In an implementation method, the first cell is an NR cell, to be specific, a cell in a gNB, the dual connectivity capability includes an EN-DC capability, and the EN-DC capability is used to indicate whether the first cell supports establishment of EN-DC. That is, the network management entity configures the EN-DC capability for the NR cell. For example, NRCellCU is used to represent the NR cell, and the network management entity configures EN-DC support capability information for the NR cell, to indicate that the NR cell supports EN-DC or does not support EN-DC, so that a neighbor ng-eNB decides whether to establish an X2 interface with a gNB to which the NR cell belongs. For example, as shown in Table 3-1, an attribute eNDCSupport may be added to NRCellCU to indicate whether the NR cell supports EN-DC.

TABLE 3-1

| Attribute name | Support qualifier |
| --- | --- |
| eNDCSupport | Conditionally mandatory (CM), conditionally optional (CO), or optional (O) |

In another implementation method, the first cell is an NR cell, to be specific, a cell in a gNB, the dual connectivity capability includes an NGEN-DC capability, and the NGEN-DC capability is used to indicate whether the first cell supports establishment of NGEN-DC. That is, the network management entity configures the NGEN-DC capability for the NR cell. For example, NRCellCU is used to represent the NR cell, and the network management entity configures NGEN-DC support capability information for the NR cell, to indicate that the NR cell supports NGEN-DC or does not support NGEN-DC, so that a neighbor ng-eNB decides whether to establish an Xn interface with a gNB to which the NR cell belongs. For example, as shown in Table 3-2, an attribute nGENDCSupport may be added to NRCellCU, to indicate whether the NR cell supports NGEN-DC.

TABLE 3-2

| Attribute name | Support qualifier |
| --- | --- |
| nGENDCSupport | Conditionally mandatory (CM), conditionally optional (CO), or optional (O) |

In another implementation method, the first cell is an NR cell, to be specific, a cell in a gNB, the dual connectivity capability includes an NR-DC capability, and the NR-DC capability is used to indicate whether the first cell supports establishment of NR-DC. That is, the network management entity configures the NR-DC capability for the NR cell. For example, NRCellCU is used to represent the NR cell, and the network management entity configures NR-DC support capability information for the NR cell, to indicate that the NR cell supports NR-DC or does not support NR-DC, so that a neighbor gNB decides whether to establish an Xn interface with a gNB to which the NR cell belongs. For example, as shown in Table 3-3, an attribute nRDCSupport may be added to NRCellCU, to indicate whether the NR cell supports NR-DC.

TABLE 3-3

| Attribute name | Support qualifier |
| --- | --- |
| nRDCSupport | Conditionally mandatory (CM), conditionally optional (CO), or optional (O) |

In another implementation method, the first cell is an LTE cell, to be specific, a cell in an ng-eNB, the dual connectivity capability includes an NE-DC capability, and the NE-DC capability is used to indicate whether the first cell supports establishment of NE-DC. That is, the network management entity configures the NE-DC capability for the LTE cell. For example, LTECell is used to represent the LTE cell, and the network management entity configures NE-DC support capability information for the LTE cell, to indicate that the LTE cell supports NE-DC or does not support NE-DC, so that a neighbor gNB decides whether to establish an Xn interface with an ng-eNB to which the LTE cell belongs. For example, as shown in Table 3-4, an attribute nEDCSupport may be added to LTECell to indicate whether the NR cell supports NE-DC.

TABLE 3-4

| Attribute name | Support qualifier |
| --- | --- |
| nEDCSupport | Conditionally mandatory (CM), conditionally optional (CO), or optional (O) |

Figure 3:
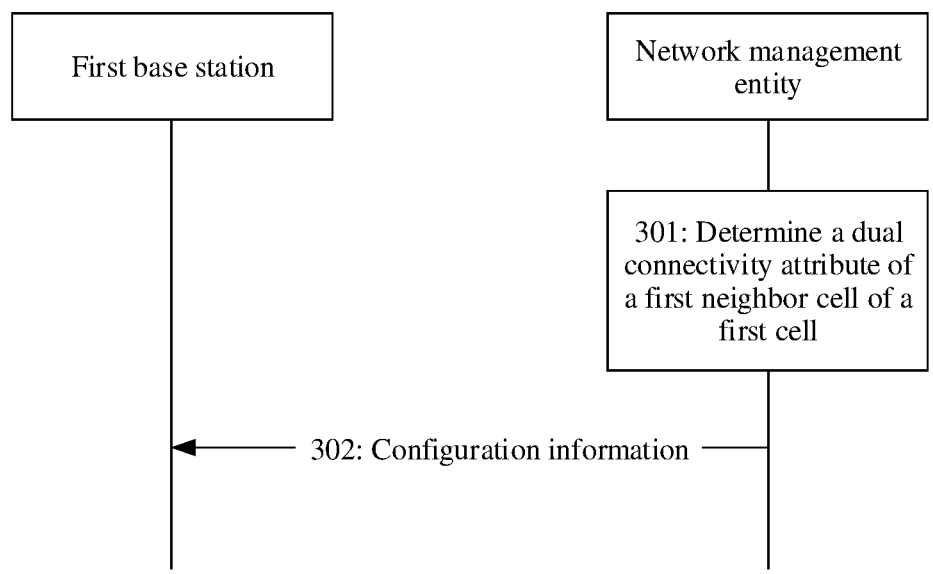
FIG. 3 is a schematic flowchart of another communication method according to an embodiment of this application.

Based on the network architecture shown in FIG. 1(a) or FIG. 1(b), as shown in FIG. 3, an embodiment of this application provides another communication method. The communication method may also be referred to as a method for configuring a dual connectivity attribute for a cell. The method is used to configure a dual connectivity attribute for a cell.

The method includes the following steps.

Step 3o1: A network management entity determines a dual connectivity attribute of a first neighbor cell of a first cell, where the dual connectivity attribute is used to indicate whether the first neighbor cell can be used as a secondary cell of the first cell, the first cell belongs to a first base station, and the first neighbor cell belongs to a second base station.

The first neighbor cell of the first cell herein means a neighbor cell in a neighbor cell relation table corresponding to the first cell.

In an implementation method, the network management entity may determine the dual connectivity attribute of the first neighbor cell of the first cell based on the following method. The network management entity obtains one or more of measurement information (for example, reference signal received power RSRP of the cell and reference signal received quality RSRQ of the cell), performance information (for example, a handover success rate of the cell, a throughput rate of the cell, and a resource utilization rate of the cell), and alarm information of the first cell or the first neighbor cell of the first cell, to determine the dual connectivity attribute of the first neighbor cell of the first cell; or the network management entity may further determine the dual connectivity attribute of the first neighbor cell of the first cell by using a cell policy (for example, a VIP cell) maintained by an operator.

Step 302: The network management entity sends configuration information to the first base station, where the configuration information indicates the first base station to configure the dual connectivity attribute of the first neighbor cell.

Based on the foregoing solution, the dual connectivity attribute is configured for a neighbor cell of the first cell, so that the first base station learns that neighbor cells of first cells cannot be used as secondary cells to perform multi-connectivity data transmission, so that a case that a system throughput reduces caused because a base station incorrectly configures the dual connectivity attribute is avoided when the base station cannot learn of an operator policy.

In an implementation method, the first base station is a primary base station, and the second base station is a secondary base station.

In an implementation method, before performing the embodiment corresponding to FIG. 3, the network management entity first determines that the first neighbor cell of the first cell has a dual connectivity capability, where the dual connectivity capability is used to indicate that the first neighbor cell of the first cell supports establishment of dual connectivity. For a method for configuring the dual connectivity capability of the first neighbor cell of the first cell, refer to the embodiment corresponding to FIG. 2.

The following provides two methods for configuring the dual connectivity attribute. To be specific, step 302 may be performed by using the following method 1, or may be performed by using the following method 2.

Method 1: The configuration information in step 302 indicates the first base station to add the first neighbor cell to a black list or a white list.

The black list is used to indicate that the first neighbor cell cannot be used as the secondary cell to perform data transmission, and the white list is used to indicate that the first neighbor cell can be used as the secondary cell to perform data transmission.

When the configuration information indicates the first base station to add the first neighbor cell to the black list, the first base station adds the first neighbor cell to the corresponding black list, to indicate that the first neighbor cell cannot be used as the secondary cell of the first base station to perform data transmission.

When the configuration information indicates the first base station to add the first neighbor cell to the white list, the first base station adds the first neighbor cell to the corresponding white list, to indicate that the first neighbor cell can be used as the secondary cell of the first base station to perform data transmission.

It should be noted that, in this embodiment of this application, each base station may be corresponding to one black list and/or one white list. Alternatively, each cell of each base station may be corresponding to one black list and/or one white list, and information in black lists and/or white lists corresponding to different cells of a same base station may be repeated. This is not limited in the present disclosure. Identification information of a cell recorded in the black list or the white list may be one or more of an ECGI, a CGI, or a PCI.

The following separately provides descriptions with reference to four different dual connectivity scenarios. For example, the first base station is the primary base station, and the second base station is the secondary base station.

Scenario 1: EN-DC scenario (where the primary base station is an eNB, and the secondary base station is an en-gNB.)

The network management entity configures a black list (for example, referred to as a no EN-DC black list) for the eNB, and a cell in the list is a cell of the en-gNB. The eNB cannot establish an EN-DC transmission connection to the cell in the no EN-DC black list. Optionally, if having established the EN-DC transmission connection to the cell in the no EN-DC black list, the eNB needs to release the EN-DC transmission connection to the cell in the no EN-DC black list.

The network management entity configures a white list (for example, referred to as a no EN-DC white list) for the eNB, and a cell in the list is a cell of the en-gNB. The eNB can establish an EN-DC transmission connection to the cell in the no EN-DC white list.

For example, attributes eNDCBlackList and eNDCWhiteList may be added to ENBFunction, as shown in Table 4-1.

TABLE 4-1

| Attribute name | Support qualifier |
| --- | --- |
| eNDCBlackList | Conditionally mandatory (CM), conditionally optional (CO), or optional (O) |
| eNDCWhiteList | Conditionally mandatory (CM), conditionally optional (CO), or optional (O) |

Scenario 2: NGEN-DC scenario (where the primary base station is an ng-eNB, and the secondary base station is a gNB)

The network management entity configures a black list (for example, referred to as a no NGEN-DC black list) for the ng-eNB, and a cell in the list is a cell of the gNB. The eNB cannot establish an NGEN-DC transmission connection to the cell in the no NGEN-DC black list. Optionally, if having established the NGEN-DC transmission connection to the cell in the no NGEN-DC black list, the eNB needs to release the NGEN-DC transmission connection to the cell in the no NGEN-DC black list.

The network management entity configures a white list (for example, referred to as a no NGEN-DC white list) for the ng-eNB, and a cell in the list is a cell of the gNB. The eNB can establish an NGEN-DC transmission connection to the cell in the no NGEN white list.

For example, attributes nGENDCBlackList and nGENDCWhiteList may be added to ENBFunction, as shown in Table 4-2.

TABLE 4-2

| Attribute name | Support qualifier |
| --- | --- |
| nGENDCBlackList | Conditionally mandatory (CM), conditionally optional (CO), or optional (O) |
| nGENDCWhiteList | Conditionally mandatory (CM), conditionally optional (CO), or optional (O) |

Scenario 3: NR-DC scenario (where the primary base station is an gNB, and the secondary base station is another gNB)

The network management entity configures a black list (for example, referred to as a no NR-DC black list) for the gNB, and a cell in the list is a cell of the gNB. The eNB cannot establish an NR-DC transmission connection to the cell in the no NR-DC black list. Optionally, if having established the NR-DC transmission connection to the cell in the no NR-DC black list, the eNB needs to release the NR-DC transmission connection to the cell in the no NR-DC black list.

The network management entity configures a white list (for example, referred to as a no NR-DC white list) for the gNB, and a cell in the list is a cell of the gNB. The eNB can establish an NR-DC transmission connection to the cell in the no NR-DC white list.

For example, attributes nRDCBlackList and nRDCWhiteList may be added to GNBCUCPFunction, as shown in Table 4-3.

TABLE 4-3

| Attribute name | Support qualifier |
| --- | --- |
| nRDCBlackList | Conditionally mandatory (CM), conditionally optional (CO), or optional (O) |
| nRDCWhiteList | Conditionally mandatory (CM), conditionally optional (CO), or optional (O) |

Scenario 4: NE-DC scenario (the primary base station is a gNB, and the secondary base station is an ng-eNB)

The network management entity configures a black list (for example, referred to as a no NE-DC black list) for the gNB, and a cell in the list is a cell of the ng-eNB. The eNB cannot establish an NE-DC transmission connection to the cell in the no NE-DC black list. Optionally, if having established the NE-DC transmission connection to the cell in the no NE-DC black list, the eNB needs to release the NE-DC transmission connection to the cell in the no NE-DC black list.

The network management entity configures a white list (for example, referred to as a no NE-DC white list) for the gNB, and a cell in the list is a cell of the ng-eNB. The eNB can establish an NE-DC transmission connection to the cell in the no NE-DC white list.

For example, attributes nEDCblacklist and nEDCwhitelist may be added to GNBCUCPFunction, as shown in Table 4-4.

TABLE 4-4

| Attribute name | Support qualifier |
| --- | --- |
| nEDCblacklist | Conditionally mandatory (CM), conditionally optional (CO), or optional (O) |
| nEDCwhitelist | Conditionally mandatory (CM), conditionally optional (CO), or optional (O) |

Method 2: The configuration information in step 302 indicates the first base station to configure indication information for the first neighbor cell of the first cell, where the indication information indicates that the first neighbor cell of the first cell can be used as the secondary cell of the first cell, or indicates that the first neighbor cell of the first cell cannot be used as the secondary cell of the first cell.

The following separately provides descriptions with reference to four different dual connectivity scenarios. For example, the first base station is the primary base station, and the second base station is the secondary base station.

Scenario 1: EN-DC scenario (where the primary base station is an eNB, and the secondary base station is an en-gNB.)

For example, if an NR neighbor cell relation of the eNB is represented by NRCellRelation in a protocol, the network management entity may add a piece of indication information (for example, referred to as isENDCallowed) to a neighbor cell relation in the neighbor cell relation table of the first cell, to indicate whether an NR neighbor cell (namely, the first neighbor cell) of the first cell can be used as a secondary cell. A value of isENDCallowed may be "YES" or "NO", "0" or "1", or another value having an enable or disable meaning. This is not limited herein in the present disclosure.

For example, as shown in Table 5-1, an isENDCallowed attribute is newly added to NRCellRelation.

TABLE 5-1

| Attribute name | Support qualifier |
| --- | --- |
| isENDCallowed | Conditionally mandatory (CM), conditionally optional (CO), or optional (O) |

For example, the value of isENDCallowed is "YES" or "NO". If the value of isENDCallowed is "YES", it indicates that the first neighbor cell is allowed to be used as the secondary cell to perform data transmission. It may be understood that the primary base station is identified by a name of an ENBFunction base station to which an EUtranGenericCell cell or a UtranGenericCell cell having the isENDCallowed attribute in NRCellRelation belongs, the secondary cell is referenced by NRCellRelation, and an indication of isENDCallowed is configured in NRCellRelation. If the value of isENDCallowed is "NO", the first neighbor cell is not allowed to be used as the secondary cell to perform data transmission.

Scenario 2: NGEN-DC scenario (where the primary base station is an ng-eNB, and the secondary base station is a gNB)

For example, if an NR neighbor cell relation of the ng-eNB is represented by NRCellRelation in a protocol, the network management entity may add a piece of indication information (for example, referred to as isNGENDCallowed) to a neighbor cell relation in the neighbor cell relation table of the first cell, to indicate whether an NR neighbor cell (namely, the first neighbor cell) of the first cell can be used as a secondary cell. A value of isNGENDCallowed may be "YES" or "NO", "0" or "1", or another value having an enable or disable meaning. This is not limited herein in the present disclosure.

For example, as shown in Table 5-2, an isNGENDCallowed attribute is newly added to NRCellRelation.

TABLE 5-2

| Attribute name | Support qualifier |
| --- | --- |
| isNGENDCallowed | Conditionally mandatory (CM), conditionally optional (CO), or optional (O) |

For example, the value of isNGENDCallowed is "YES" or "NO". If the value of isNGENDCallowed is "YES", the first neighbor cell is allowed to be used as the secondary cell to perform data transmission. It may be understood that the primary base station is identified by a name of a GNB-CUCPFunction base station to which an NRCellCU cell having the isNGENDCallowed attribute in NRCellRelation belongs, the secondary cell is referenced by NRCellRelation, and an indication of isNGENDCallowed is configured in NRCellRelation. If the value of isNGENDCallowed is "NO", the first neighbor cell is not allowed to be used as the secondary cell to perform data transmission.

Scenario 3: NR-DC scenario (where the primary base station is an gNB, and the secondary base station is another gNB)

For example, if an NR neighbor cell relation of the gNB is represented by NRCellRelation in a protocol, the network management entity may add a piece of indication information (for example, referred to as isNRDCallowed) to a neighbor cell relation in the neighbor cell relation table of the first cell, to indicate whether an NR neighbor cell (namely, the first neighbor cell) of the first cell can be used as a secondary cell in NR-DC. A value of isNRDCallowed may be "YES" or "NO", or "0" or "1".

For example, as shown in Table 5-3, an isNRDCallowed attribute is newly added to NRCellRelation.

TABLE 5-3

| Attribute name | Support qualifier |
| --- | --- |
| isNRDCallowed | Conditionally mandatory (CM), conditionally optional (CO), or optional (O) |

For example, the value of isNRDCallowed is "YES" or "NO". If the value of isNRDCallowed is "YES", the first neighbor cell is allowed to be used as the secondary cell to perform data transmission. It may be understood that the primary base station is identified by a name of an ENB-Function base station to which an EUtranGenericCell cell or a UtranGenericCell cell having the isNGENDCallowed attribute in NRCellRelation belongs, the secondary cell is referenced by NRCellRelation, and an indication of isNGENDCallowed is configured in NRCellRelation. If the value of isNRDCallowed is "NO", the first neighbor cell is not allowed to be used as the secondary cell to perform data transmission.

Scenario 4: NE-DC scenario (the primary base station is a gNB, and the secondary base station is an ng-eNB)

For example, if an LTE neighbor cell relation of the gNB is represented by EutranCellRelation in a protocol, the network management entity may add a piece of indication information (for example, referred to as isNEDCallowed) to a neighbor cell relation in the neighbor cell relation table of the first cell, to indicate whether an LTE neighbor cell (namely, the first neighbor cell) of the first cell can be used as a secondary cell in NE-DC. A value of isNEDCallowed may be "YES" or "NO", or "o" or "1".

For example, as shown in Table 5-4, an isNEDCallowed attribute is newly added to EutranCellRelation.

TABLE 5-4

| Attribute name | Support qualifier |
| --- | --- |
| isNEDCallowed | Conditionally mandatory (CM), conditionally optional (CO), or optional (O) |

For example, the value of isNEDCallowed is "YES" or "NO". If the value of isNEDCallowed is "YES", the first neighbor cell is allowed to be used as the secondary cell to perform data transmission. It may be understood that the primary base station is identified by a name of a GNB-CUCPFunction base station to which an NRCellCU cell having the isNEDCallowed attribute in EutranCellRelation belongs, the secondary cell is referenced by EutranCellRelation, and an indication of isNEDCallowed is configured in EutranCellRelation. If the value of isNEDCallowed is "NO", the first neighbor cell is not allowed to be used as the secondary cell to perform data transmission.

It may be understood that, in the foregoing method embodiments, corresponding steps or operations implemented by the network management entity may alternatively be implemented by a component (for example, a chip or a circuit) configured in the network management entity.

Figure 4:
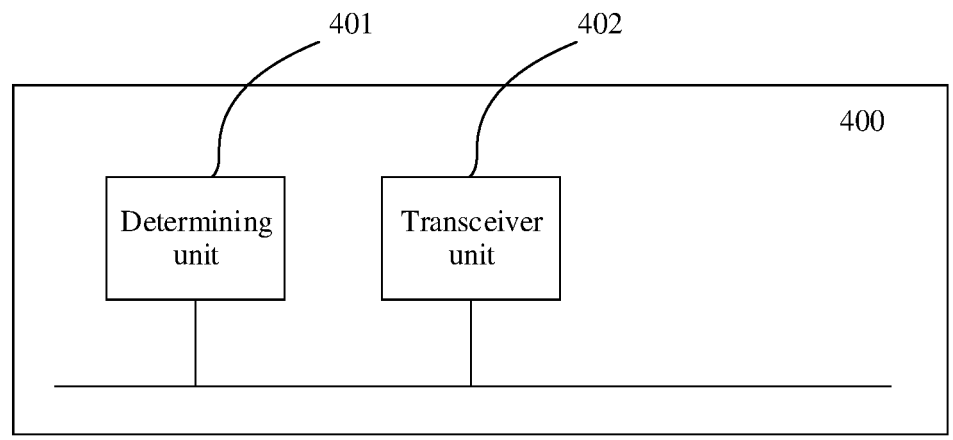
FIG. 4 is a schematic diagram of a communication apparatus according to an embodiment of this application.

FIG. 4 is a schematic diagram of a communication apparatus according to an embodiment of this application. The apparatus is configured to implement steps performed by the corresponding network management entity in the foregoing method embodiments. As shown in FIG. 4, the apparatus 400 includes a determining unit 401 and a transceiver unit 402.

The determining unit 401 is configured to determine a dual connectivity attribute of a first neighbor cell of a first cell, where the dual connectivity attribute is used to indicate whether the first neighbor cell can be used as a secondary cell of the first cell, the first cell belongs to a first base station, and the first neighbor cell belongs to a second base station. The transceiver unit 402 is configured to send configuration information to the first base station, where the configuration information indicates the first base station to configure the dual connectivity attribute of the first neighbor cell.

In a possible implementation method, that the configuration information indicates the first base station to configure the dual connectivity attribute of the first neighbor cell includes, the configuration information indicates the first base station to configure indication information for the first neighbor cell, where the indication information indicates that the first neighbor cell can be used as the secondary cell of the first base station, or indicates that the first neighbor cell cannot be used as the secondary cell of the first base station.

In a possible implementation method, that the configuration information indicates the first base station to configure the dual connectivity attribute of the first neighbor cell includes, the configuration information indicates the first base station to add the first neighbor cell to a black list, where the black list is used to record a cell that is in a neighbor cell of the first cell and that cannot be used as the secondary cell of the first cell; or the configuration information indicates the first base station to add the first neighbor cell to a white list, where the white list is used to record a cell that is in a neighbor cell of the first cell and that can be used as the secondary cell of the first cell.

In a possible implementation method, the determining unit 401 is further configured to, before the transceiver unit sends the configuration information to the first base station, determine that the first neighbor cell has a dual connectivity capability, where the dual connectivity capability is used to indicate that the first neighbor cell supports establishment of dual connectivity.

In a possible implementation method, the first cell is an NR cell, the dual connectivity capability includes an EN-DC capability, and the EN-DC capability is used to indicate that the first cell supports establishment of EN-DC; the first cell is an NR cell, the dual connectivity capability includes an NGEN-DC capability, and the NGEN-DC capability is used to indicate that the first cell supports establishment of NGEN-DC; the first cell is an NR cell, the dual connectivity capability includes an NR-DC capability, and the NR-DC capability is used to indicate that the first cell supports establishment of NR-DC; or the first cell is an LTE cell, the dual connectivity capability includes an NE-DC capability, and the NE-DC capability is used to indicate that the first cell supports establishment of NE-DC.

In a possible implementation method, the first base station is a primary base station, and the second base station is a secondary base station.

In a possible implementation method, the communication apparatus is a management service consumer, a management service producer, an MBB automation engine, a network management system, or an element management system.

In a possible implementation method, the determining unit 401 is specifically configured to determine a dual connectivity attribute of the first neighbor cell based on first information of the first cell and/or second information of the first neighbor cell, where the first information includes one or more of measurement information, performance information, and alarm information of the first cell, and the second information includes one or more of measurement information, performance information, and alarm information of the first neighbor cell; or determine a dual connectivity attribute of the first neighbor cell according to a cell policy maintained by an operator.

It may be understood that the foregoing units may also be referred to as modules, circuits, or the like, and the foregoing units may be independently disposed, or may be all or partially integrated.

In some possible implementations, the transceiver unit 402 may also be referred to as a communication interface.

Optionally, the communication apparatus 400 may further include a storage unit. The storage unit is configured to store data or instructions (which may also be referred to as code or a program). The foregoing units may interact with or be coupled to the storage unit, to implement a corresponding method or function. For example, a processing unit may read the data or the instructions in the storage unit, so that the communication apparatus implements the methods in the foregoing embodiments.

It should be understood that division into the units in the apparatus is merely logical function division. During actual implementation, all or some of the units may be integrated into one physical entity or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, a unit in any one of the foregoing apparatuses may be one or more integrated circuits configured to implement the foregoing methods, for example, one or more application-specific integrated circuits (ASICs), one or more microprocessors (DSPs), one or more field programmable gate arrays (FPGAs), or a combination of at least two of the integrated circuit forms. For another example, when the units in the apparatus may be implemented in a form in which a processing element invokes a program, the processing element may be a general-purpose processor, for example, a central processing unit (CPU) or another processor that can invoke the program. For still another example, the units may be integrated and implemented in a form of a system-on-a-chip (SOC).

The foregoing unit (for example, the receiving unit) for receiving is an interface circuit of the apparatus, and is configured to receive a signal from another apparatus. For example, when the apparatus is implemented by a chip, the receiving unit is an interface circuit that is of the chip and that is configured to receive a signal from another chip or apparatus. The foregoing unit (for example, the sending unit) for sending is an interface circuit of the apparatus, and is configured to send a signal to another apparatus. For example, when the apparatus is implemented by a chip, the sending unit is an interface circuit that is of the chip and that is configured to send a signal to another chip or apparatus.

Figure 5:
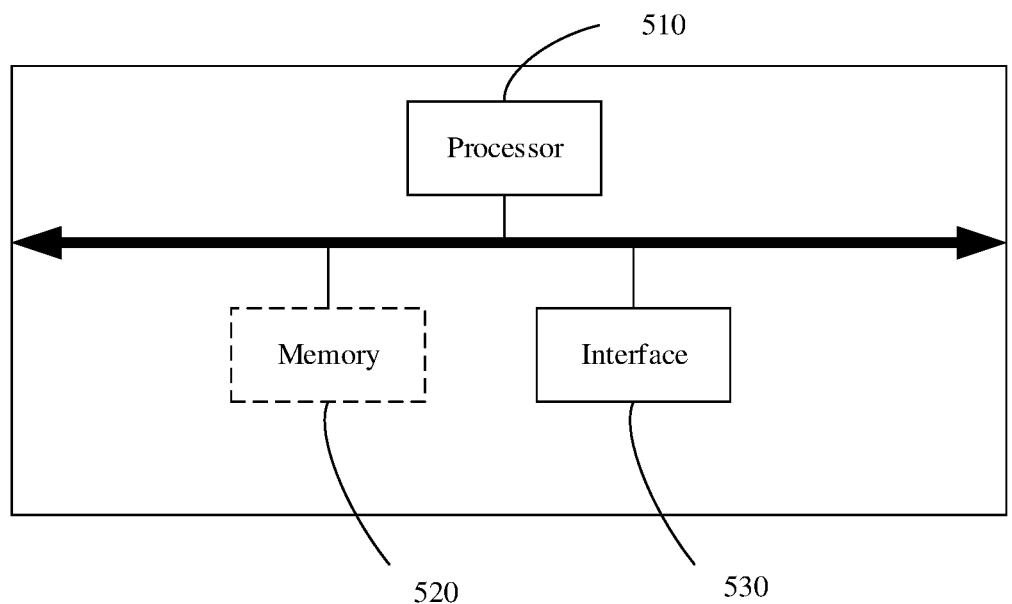
FIG. 5 is a schematic diagram of a network management entity according to an embodiment of this application.

FIG. 5 is a schematic diagram of a structure of a network management entity according to an embodiment of this application, configured to implement operations of the network management entity in the foregoing embodiments. As shown in FIG. 5, the network management entity includes a processor 510 and an interface 530, and optionally, further includes a memory 520. The interface 530 is configured to communicate with another device.

The methods performed by the network management entity in the foregoing embodiments may be implemented by the processor 510 by invoking a program stored in a memory (which may be the memory 520 in the network management entity, or may be an external memory). To be specific, an apparatus used for the network management entity may include the processor 510, the processor 510 invokes the program in the memory to perform the methods performed by the network management entity in the foregoing method embodiments. The processor herein may be an integrated circuit having a signal processing capability, for example, a CPU. The apparatus used for the network management entity may be configured to be one or more integrated circuits, for example, one or more ASICs, one or more microprocessors DSPs, one or more FPGAs, or a combination of at least two of the integrated circuit forms, that implement the foregoing methods. Alternatively, the foregoing implementations may be combined.

All or some of the foregoing embodiments may be implemented by using software, hardware, firmware, or any combination thereof. When the software is used to implement the foregoing embodiments, all or some of the foregoing embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits in embodiments of this application may implement or operate the functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, for example, a digital signal processor and a microprocessor, a plurality of microprocessors, one or more microprocessors in combination with a digital signal processor core, or any other similar configuration.

In one or more example designs, the functions described in this application may be implemented by using hardware, software, firmware, or any combination thereof. If the functions are implemented by using the software, these functions may be stored in a computer-readable medium or are transmitted to the computer-readable medium in a form of one or more instructions or code. The computer-readable medium includes a computer storage medium and a communication medium that enables a computer program to move from one place to another. The storage medium may be an available medium that may be accessed by any general-purpose or special computer. For example, such a computer-readable medium may include but is not limited to a RAM, a ROM, an EEPROM, a CD-ROM, another optical disc storage, a disk storage or another magnetic storage apparatus, or any other medium that may be used to bear or store program code, where the program code is in a form of an instruction or a data structure or in a form that can be read by a general or special computer or a general or special processor. In addition, any connection may be appropriately defined as the computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disk (disk) and the disc (disc) include a compact disc, a laser disc, an optical disc, a digital versatile disc (DVD), a floppy disk, and a Blu-ray disc. The disc usually copies data by a magnetic means, and the disk optically copies data by a laser means. The foregoing combination may also be included in the computer-readable medium.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or a special-purpose computer.

Although this application is described with reference to specific features and embodiments thereof, it is clear that various modifications and combinations may be made to them without departing from the spirit and scope of this application. Correspondingly, the specification and accompanying drawings are only example descriptions of this application defined by the appended claims, and are considered as any of or all modifications, variations, combinations or equivalents that cover the scope of this application.

It is clearly that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication method, comprising:
   determining, by a network management entity, according to a cell policy maintained by an operator, that a first neighbor cell has a dual connectivity capability, wherein the dual connectivity capability indicates that the first neighbor cell supports establishment of dual connectivity with a first cell;
   determining, on a network management entity side and by the network management entity, a dual connectivity attribute of the first neighbor cell of the first cell according to the dual connectivity capability, wherein the dual connectivity attribute indicates whether the first neighbor cell can be used as a secondary cell of the first cell, wherein the first cell belongs to a first base station, wherein the first neighbor cell belongs to a second base station, and wherein the network management entity is separate from the first base station and the second base station; and
   sending configuration information to the first base station, wherein the configuration information indicates the dual connectivity attribute of the first neighbor cell.

2. The method according to claim 1, wherein that the configuration information indicates the dual connectivity attribute of the first neighbor cell comprises:
   the configuration information indicates that the first neighbor cell can be used as the secondary cell of the first base station; or
   the configuration information indicates that the first neighbor cell cannot be used as the secondary cell of the first base station.

3. The method according to claim 1, wherein that the configuration information indicates the dual connectivity attribute of the first neighbor cell comprises:
   the configuration information indicates to add the first neighbor cell to a black list, wherein a cell in the black list is in a neighbor cell of the first cell and cannot be used as the secondary cell of the first cell; or
   the configuration information indicates to add the first neighbor cell to a white list, wherein a cell in the white list is in a neighbor cell of the first cell and that can be used as the secondary cell of the first cell.

4. The method according to claim 1, wherein the first cell is an new radio (NR) cell, the dual connectivity capability comprises an EN-DC capability, and the EN-DC capability indicates that the first cell supports establishment of EN-DC;
   the first cell is an NR cell, the dual connectivity capability comprises an NGEN-DC capability, and the NGEN-DC capability indicates that the first cell supports establishment of NGEN-DC;
   the first cell is an NR cell, the dual connectivity capability comprises an NR-DC capability, and the NR-DC capability indicates that the first cell supports establishment of NR-DC; or
   the first cell is an LTE cell, the dual connectivity capability comprises an NE-DC capability, and the NE-DC capability indicates that the first cell supports establishment of NE-DC.

5. The method according to claim 1, wherein the first base station is a primary base station, and the second base station is a secondary base station.

6. The method according to claim 1, wherein the network management entity side is one of a management service consumer, a management service producer, an MBB automation engine, a network management system, or an element management system.

7. The method according to claim 1, wherein the determining a dual connectivity attribute of a first neighbor cell of a first cell further comprises:
   determining the dual connectivity attribute of the first neighbor cell based on at least one of first information of the first cell or second information of the first neighbor cell, wherein the first information comprises one or more of measurement information, performance information, or alarm information of the first cell, and wherein the second information comprises one or more of measurement information, performance information, and alarm information of the first neighbor cell; or
   determining the dual connectivity attribute of the first neighbor cell according to a cell policy maintained by an operator.

8. An apparatus, comprising:
   a processor; and
   a non-transitory computer-readable storage medium storing a program to be executed by the processor, the program including instructions to:
   determine, according to a cell policy maintained by an operator, that a first neighbor cell has a dual connectivity capability, wherein the dual connectivity capability indicates that the first neighbor cell supports establishment of dual connectivity with a first cell;
   determine a dual connectivity attribute of the first neighbor cell of the first cell, wherein the dual connectivity attribute indicates whether the first neighbor cell can be used as a secondary cell of the first cell, wherein the first cell belongs to a first base station, wherein the first neighbor cell belongs to a second base station, and wherein the apparatus is separate from the first base station and the second base station; and
   send configuration information to the first base station, wherein the configuration information indicates the dual connectivity attribute of the first neighbor cell.

9. The apparatus according to claim 8, wherein that the configuration information indicates the dual connectivity attribute of the first neighbor cell comprises:
   the configuration information indicates that the first neighbor cell can be used as the secondary cell of the first base station; or
   the configuration information indicates that the first neighbor cell cannot be used as the secondary cell of the first base station.

10. The apparatus according to claim 8, wherein that the configuration information indicates the dual connectivity attribute of the first neighbor cell comprises:
    the configuration information indicates to add the first neighbor cell to a black list, wherein a cell in the black list is in a neighbor cell of the first cell and cannot be used as the secondary cell of the first cell; or
    the configuration information indicates to add the first neighbor cell to a white list, wherein a cell in the white list is in a neighbor cell of the first cell and that can be used as the secondary cell of the first cell.

11. The apparatus according to claim 8, wherein the first cell is an NR cell, the dual connectivity capability comprises an EN-DC capability, and the EN-DC capability indicates that the first cell supports establishment of EN-DC;
- the first cell is an NR cell, the dual connectivity capability comprises an NGEN-DC capability, and the NGEN-DC capability indicates that the first cell supports establishment of NGEN-DC;
- the first cell is an NR cell, the dual connectivity capability comprises an NR-DC capability, and the NR-DC capability indicates that the first cell supports establishment of NR-DC; or
- the first cell is an LTE cell, the dual connectivity capability comprises an NE-DC capability, and the NE-DC capability indicates that the first cell supports establishment of NE-DC.

12. The apparatus according to claim 8, wherein the first base station is a primary base station, and the second base station is a secondary base station.

13. The apparatus according to claim 8, wherein the apparatus is one of a management service consumer, a management service producer, an MBB automation engine, a network management system, or an element management system.

14. The apparatus according to claim 8, wherein the instructions further include instructions to:
- determine the dual connectivity attribute of the first neighbor cell based on at least one of first information of the first cell or second information of the first neighbor cell, wherein the first information comprises one or more of measurement information, performance information, and alarm information of the first cell, and wherein the second information comprises one or more of measurement information, performance information, and alarm information of the first neighbor cell; or
- determine the dual connectivity attribute of the first neighbor cell according to a cell policy maintained by an operator.

15. A communication system, comprising:
a network management entity configured to:
- determining, by the network management entity, according to a cell policy maintained by an operator, that a first neighbor cell has a dual connectivity capability, wherein the dual connectivity capability indicates that the first neighbor cell supports establishment of dual connectivity with a first cell;
- determine a dual connectivity attribute of the first neighbor cell of the first cell, wherein the dual connectivity attribute indicates whether the first neighbor cell can be used as a secondary cell of the first cell, wherein the first cell belongs to a first base station, wherein the first neighbor cell belongs to a second base station, and wherein the network management entity is separate from the first base station and the second base station; and
- send configuration information to the first base station; and the first base station configured to:
- receive the configuration information from the network management entity.

16. The system according to claim 15, wherein the first base station is further configured to configure indication information for the first neighbor cell, wherein:
- the indication information indicates that the first neighbor cell can be used as the secondary cell of the first base station; or
- the indication information indicates that the first neighbor cell cannot be used as the secondary cell of the first base station.

17. The system according to claim 15, wherein:
the first base station is configured to add the first neighbor cell to a black list based on the configuration information, wherein a cell in the black list is in a neighbor cell of the first cell and cannot be used as the secondary cell of the first cell; or
the first base station is configured to add the first neighbor cell to a white list based on the configuration information, wherein a cell in the white list is in a neighbor cell of the first cell and that can be used as the secondary cell of the first cell.

18. The system according to claim 15, wherein the network management entity is one of a management service consumer, a management service producer, an MBB automation engine, a network management system, or an element management system.

* * * * *